(12) United States Patent
Luu et al.

(10) Patent No.: US 8,667,510 B2
(45) Date of Patent: Mar. 4, 2014

(54) METHOD, DEVICE, AND SERVER FOR PROVIDING CONTENT TO A HANDSET

(75) Inventors: Adrianne Binh Luu, Roswell, GA (US); Jeffrey Mikan, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/568,185

(22) Filed: Aug. 7, 2012

(65) Prior Publication Data

US 2012/0303699 A1 Nov. 29, 2012

Related U.S. Application Data

(63) Continuation of application No. 12/626,282, filed on Nov. 25, 2009, now Pat. No. 8,255,929, which is a continuation of application No. 11/616,593, filed on Dec. 27, 2006, now Pat. No. 7,627,683.

(51) Int. Cl.
 *G06F 13/00* (2006.01)

(52) U.S. Cl.
 USPC ............................ 719/318; 709/230; 709/231

(58) Field of Classification Search
 USPC .................................. 719/318; 709/230, 231
 See application file for complete search history.

(56) References Cited

U.S. PATENT DOCUMENTS

| | | |
|---|---|---|
| 5,768,528 A | 6/1998 | Stumm |
| 6,625,810 B1 | 9/2003 | Murphy et al. |
| 7,082,398 B1 | 7/2006 | Apple et al. |
| 7,299,050 B2 | 11/2007 | Delaney et al. |
| 7,412,534 B2 | 8/2008 | Tsang et al. |
| 7,747,962 B2 | 6/2010 | Othmer |
| 7,774,815 B1 | 8/2010 | Allen |
| 7,953,088 B2 * | 5/2011 | Cheriton et al. ............... 370/392 |
| 2003/0120705 A1 | 6/2003 | Chen et al. |
| 2004/0172655 A1 | 9/2004 | Nishiyama et al. |
| 2005/0108388 A1 | 5/2005 | Bou-Ghannam et al. |
| 2006/0168624 A1 | 7/2006 | Carney et al. |
| 2006/0288329 A1 | 12/2006 | Gandhi et al. |
| 2008/0288470 A1 * | 11/2008 | Goutard et al. .................... 707/4 |
| 2013/0007630 A1 * | 1/2013 | Dolgin .......................... 715/747 |

\* cited by examiner

*Primary Examiner* — Andy Ho
(74) *Attorney, Agent, or Firm* — Parks IP Law LLC; Mickki D. Murray, Esq.

(57) ABSTRACT

A system and method for providing time-sensitive information to a handset using a scrolling ticker. The method includes receiving the time-sensitive information at a server, determining the time period before the next update for a second set of information, and if less than a pre-determined value, then streaming the time sensitive information at the end of the time period to the handset. If the time period is greater that than the pre-determined value, then streaming the time-sensitive information immediately. In an alternative embodiment, a method is provided which includes determining a base schedule for periodically streaming the information to a handset via a scrolling ticker, receiving time-sensitive information relating to an event, determining a second schedule for periodically streaming time-sensitive information related to the event, and streaming the time-sensitive information in accordance with the second schedule during a time period associated with the event.

20 Claims, 6 Drawing Sheets

METHOD, DEVICE, AND SERVER FOR PROVIDING CONTENT TO A HANDSET

CROSS REFERENCE TO RELATED APPLICATIONS

This application is a continuation of U.S. application Ser. No. 12/626,282 (now U.S. Pat. No. 8,255,929), filed Nov. 25, 2009, which is a continuation of U.S. application Ser. No. 11/616,593 (now U.S. Pat. No. 7,627,683), filed Dec. 27, 2006, the entireties of which are incorporated herein by reference.

FIELD OF THE INVENTION

This invention is directed to the provision of data to a handset; and more particularly, determining the most efficient timing for delivering time-sensitive data to a handset using a scrolling ticker.

BACKGROUND OF THE INVENTION

In wireless data applications, there are two types of technology utilized to transfer data to a handset, categorized generally as either push technology or pull technology. In push technology, a server typically will periodically push available information to a handset, or alternatively, send a message to the handset indicating that additional information is available for the handset to retrieve. Pull technology is typically defined as the client initiating communication with a server in order to retrieve information.

Recently, carriers and vendors of wireless devices have developed systems, methods and wireless devices that push content to subscribers in the form of a scrolling ticker which may contain headlines, sports scores, stock information, or other data or alerts on a portion of the display screen. For example, such systems are commercially available on Motorola wireless device model V557 and available to subscribers of Cingular Wireless, the assignee of the present invention, which Cingular Wireless markets as Active Home Screen™. The scrolling ticker may receive data from multiple channels, including news, sports, weather, and the like.

Such data that is pushed to devices typically have a useful life before the data is considered stale or out of date. Thus, time-to-live ("TTL") schemes have been defined which is the measure of the time data is made available until that data is out of date. TTL data has an expiration after which it is preferable that he data be updated.

TTL will vary based on the type of data and the current activity level. By way of example only, news events may be updated every hour, weather forecasts may be updated several times per day, and horoscopes updated daily. Unfortunately, simply scheduling periodic updates based on the types of information does not provide flexibility in determining the delivery times based on the information itself. Notwithstanding periodic updates, additional information that becomes available that is time-sensitive may be received. It would be desirable to be able to push this time-sensitive information to the handset immediately.

Currently, there is no system and method for intermediate delivery of time-sensitive information that may be accomplished periodically or a-periodically. In addition to there being a need to provide intermediate delivery for time-critical information, there is also a need for the delivery times of the data be subject to multiple and variable cycles. For example, it would be desirable to have a system and method for providing sports information relating to baseball that be updated once a day during the off-season, once every four or six hours during the season and just prior to a game, and perhaps every fifteen minutes during a game or alternatively, a-periodically whenever a run is scored during the game. Such a system and method does not exist.

SUMMARY OF THE INVENTION

In order to overcome these and other deficiencies in the prior art, the present invention is directed to a method for providing time-sensitive information to a handset using a scrolling ticker. The method includes receiving the time-sensitive information at a server, determining the time period before the next update for a second set of information, and then, if the time period is less than a pre-determined value, streaming the time sensitive information at the end of the time period to the handset. If the time period is greater that than the pre-determined value, however, the time-sensitive information is streamed immediately. In accordance with another aspect of the invention, the second set of information may be updated periodically or a-periodically. The streaming step includes streaming the second set of information and the time sensitive information as part of a communications event wherein the streaming may be on one or a plurality of channels.

In addition to the method of the present invention, there is also a system for providing time-sensitive information to a handset via a scrolling ticker including means for receiving time-sensitive information and a second set of information wherein the second set of information is updated periodically, means for determining a next update time for the second set of information, means for comparing a time period before the next update time to a predetermined value, means for scheduling the streaming of time-sensitive information responsive to the means for comparing, and means for streaming the time sensitive information and the second set of information to a handset. The system may further include means for streaming the time-sensitive information immediately to a handset if the time period is greater than the pre-determined value, or alternatively, if the time period is less than the predetermined value, then means for streaming the time-sensitive information and the second set of information to a handset as part of a single communications event. The streaming may be performed on one or a plurality of channels.

According to another embodiment of the invention, a method for scheduling delivery of information via a scrolling ticker is provided. The method includes the steps of determining a base schedule for periodically streaming the information to a handset via a scrolling ticker, receiving time-sensitive information relating to an event, determining a second schedule for periodically streaming time-sensitive information related to the event, and streaming the time-sensitive information in accordance with the second schedule. The streaming of time-sensitive information may be performed in accordance with the second schedule during a time period associated with the event and then optionally reverting back to the base schedule after the time period has elapsed.

In accordance with yet another embodiment of the invention, a method for scheduling delivery of information via a scrolling ticker is provided, including determining a base schedule for periodically streaming the information to a handset via a scrolling ticker, suspending the base schedule during a time period associated with an event, receiving time-sensitive information relating to the event, and streaming the time-sensitive information based on the receiving step. The streaming step may be performed promptly after receipt of the time-sensitive information or within a pre-defined window of time after receipt of the time-sensitive information.

In yet another embodiment of the invention, there is a system for streaming information to a handset via a scrolling ticker relating to an event including means for streaming the information periodically in accordance with a base schedule and means for streaming the information in accordance with a second schedule based on an event, wherein the information is streamed in accordance with the second schedule during a time period associated with the event. The second schedule may be periodic or based on a alerts relating to the event.

DETAILED DESCRIPTION OF ILLUSTRATIVE EMBODIMENTS

Figure 1:
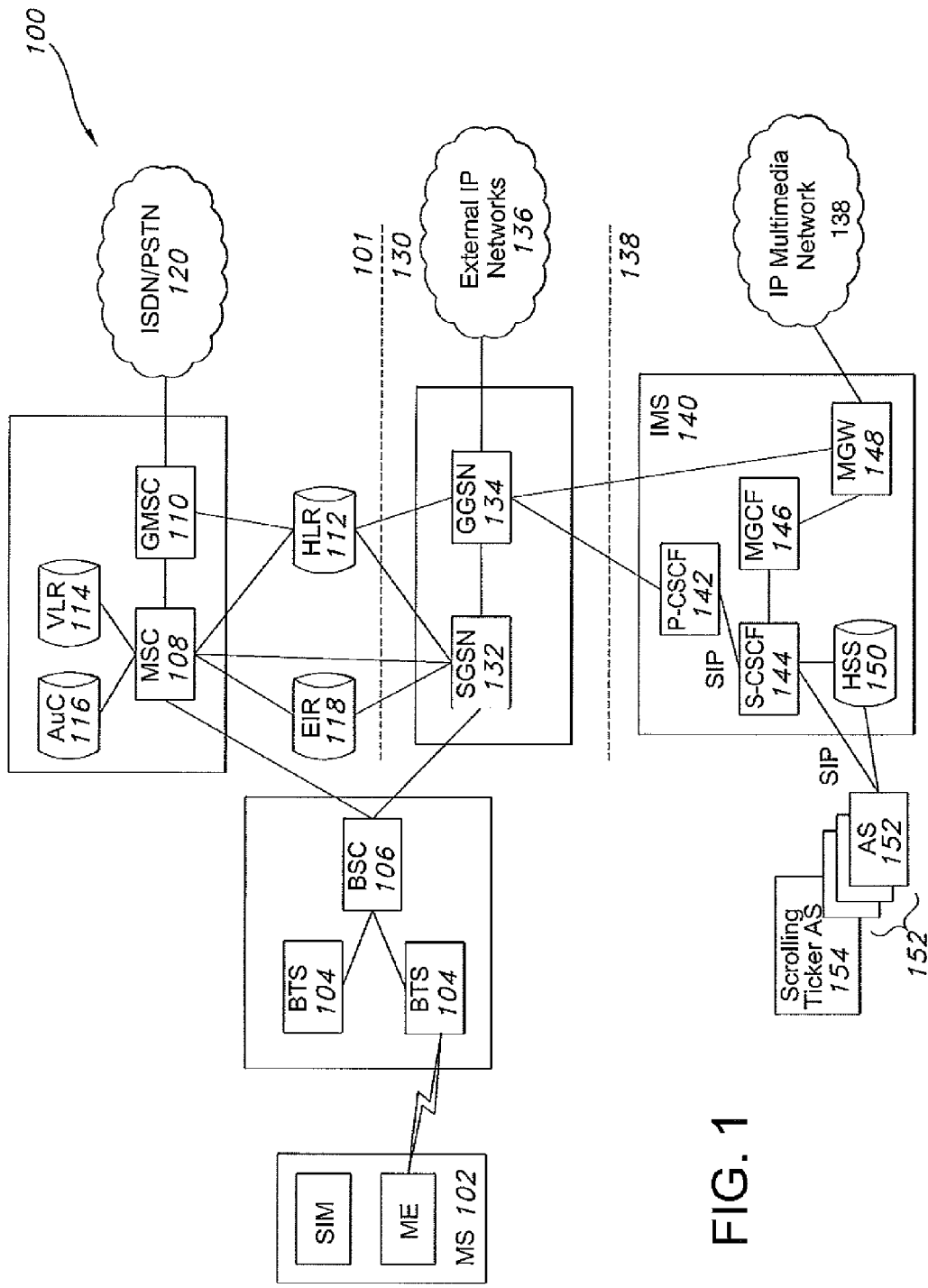
FIG. 1. is a functional block diagram of an exemplary network environment within which the present invention may operate.

The present invention will now be described with reference to the attached figures in the context of a preferred embodiment which has been selected as exemplary for the purposes of illustration wherein like reference numerals signify like functionality. Such exemplary embodiments are not intended to limit the invention beyond the limitations set forth in the appended claims.

FIG. 1 shows a GSM/GPRS/IP multimedia network architecture 100 that includes a GSM core network 101, a GPRS network 130 and an IP multimedia network 138. This network architecture 100 will serve as an exemplary embodiment in which the present environment may operate. However, it should be understood that the present invention may operate on other networks, including TDMA, CDMA, WCDMA, 2.5G, 3G and any other network which supports data streaming from a server to a mobile station.

The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer, that is used by mobile subscribers with a Subscriber Identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 108 manages radio resources, including the BTS. The BSC may be connected to several BTSs. The BSC and BTS components, in combination, are generally referred to as a Base Station Subsystem (BSS).

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 116, and an Equipment Identity Register (MR) 118. The MSC 108 performs a switching function for the network. The MSC 108 also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR 114 contains information necessary for call control and provision of subscribed services for each MS 102 currently located in a geographical area controlled by the VLR 114. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

To gain access to GSM services, such as speech, data, and short message service (SMS), the MS 102 first registers with the network to indicate its current location by performing a location update and International Mobile Subscriber Identity (IMSI) attach procedure. The MS 102 sends a location update including its current location information to the MSC/VLR 108/114, via the BTS 104 and the BSC 106. The location information is then sent to the MS's HLR 112. The HLR 112 is updated with the location information received from the MSC/VLR 108/114. The location update also is performed when the MS 102 moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132 and a Gateway GPRS support node (GGSN) 134. The SGSN 132 is at the same hierarchical level as the MSC 108 in the GSM network. The SGSN 132 controls the connection between the GPRS network and the MS 102. The SGSN 132 also keeps track of individual MS's locations and security functions and access controls. The GGSN 134 provides a gateway between the GPRS network 130 and a public data network (PDN) or other external IP networks 136. That is, the GGSN 134 provides interworking functionality with external networks, and sets up a logical link to the MS 102 through the SGSN 132. When packet-switched data leaves the GPRS network 130, it is transferred to an external TCP-IP network 136, such as an X.25 network or the Internet. In order to access GPRS services, the MS 102 first attaches itself to the GPRS network 130 by performing an attach procedure. The MS 102 then activates a packet data protocol (PDP) context, thus activating a packet communication session between the MS 102, the SGSN 132, and the GGSN 134.

In a GSM/GPRS network, GPRS services and GSM services can be used in parallel. The MS 102 can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network 130 is indicated by a parameter in system information messages transmitted within a cell. The system information messages dictates an MS 102 where to listen for paging messages and how signal towards the network. The network operation mode represents the capabilities of the GPRS network 130. In a NOM1 network, an MS 102 can receive pages from a circuit switched domain (voice call) when engaged in a data call. The MS 102 can suspend the data call or take both simultaneously, depending on the ability of the MS 102. In a NOM2 network, an MS 102 may not receive pages from a circuit switched domain when engaged in a data call, since the MS 102 is receiving data and is not listening to a paging channel. In a NOM3 network, an MS 102 can monitor pages for a circuit switched network while receiving data and vise versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF) 142/144, a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three different types contemplated: an interrogating CSCF (I-CSCF) (not shown), a proxy CSCF (P-CSCF) 142, and a serving CSCF (S-CSCF) 144. The P-CSCF 142 is the MS's 102 first point of contact with the IMS 140. The P-CSCF 142 forwards session initiation protocol (SIP) messages received from the MS to an SIP server in a home network (and vice versa) of the MS 102. The P-CSCF 142 may also modify an outgoing request according to a set of rules defined by the network operator (for example, address analysis and potential modification).

The I-CSCF function, which forms the entrance to a home network, hides the inner topology of the home network from other networks and provides flexibility for selecting an S-CSCF 144.

The S-CSCF 144 performs the session control services for the MS 102. This includes routing originating sessions to external networks and routing terminating sessions to visited networks. The S-CSCF 144 also decides whether one or more application servers (AS) 152 is required to receive information on an incoming SIP session request to ensure appropriate service handling. This decision is based on information received from the HSS 150 (or other sources, such as an application server 154).

The HSS 150 contains a subscriber profile and keeps track of which core network node is currently handling the subscriber. It also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Figure 2:
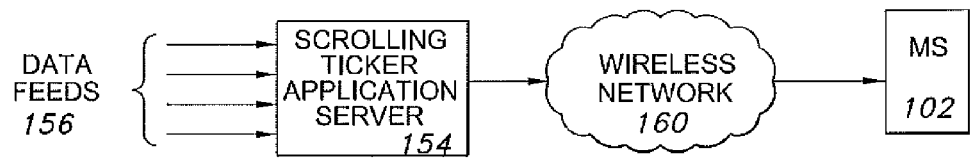
FIG. 2 is a functional block diagram illustrating the core components and a generic wireless network which may be utilized to implement the present invention.

While FIG. 1 illustrates a GSM/GPRS/IP multimedia architecture which supports the present invention, implementation of the present invention is not limited thereto. With reference to FIG. 2, there is shown a simplified block diagram for a system constructed in accordance with the present invention. A plurality of data feeds 156 are input to the scrolling ticker application server 154 which then transmits selected feeds across a wireless network 160 to the MS 102. The wireless network 160 may be that as illustrated and described with reference to FIG. 1, or it could be a time division multiple access (TDMA), a code division multiple access (CDMA), a wideband code division multiple access (WCDMA), or any other wireless network, including those specific to 3G and beyond. For the convenience of the user, the terms mobile station, user equipment and wireless device may be used interchangeably throughout this specification.

The scrolling ticker application server 154 is one form of the one or more application servers 152. The scrolling ticker server 154 is preferably a content server configured to communicate with one or more wireless devices, such as MS 102. The scrolling ticker server 154 streams content to wireless devices configured to receive such data. The scrolling ticker server 154 may, for example, provide text streams based on a set of user-defined alerts, such as stock information, sports scores, news, weather, and any other information, or the text streams may be provided on a periodic basis. One communication protocol between the scrolling ticker server 154 to the MS 102 may, for example, be really simple syndication (RSS), more specifically, the RSS 2.0 standard.

Figure 3:
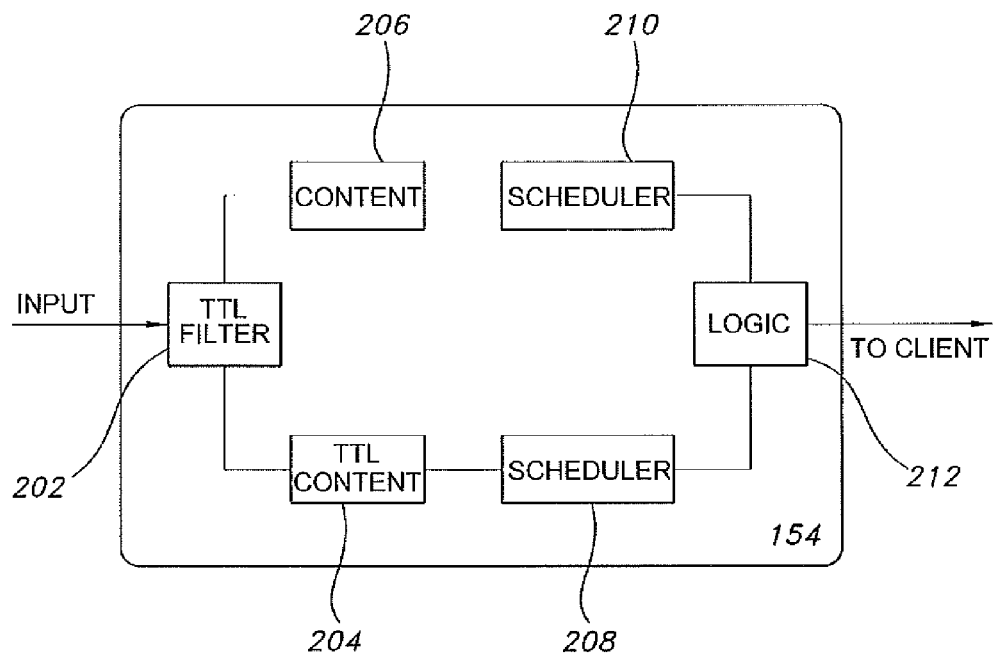
FIG. 3 illustrates the scheduling functionality of the application server in FIG. 1.

Turning to FIG. 3, there is a block diagram which illustrates functionally the scheduling logic of the scrolling ticker application server 154. Input to the server may come from a variety of sources in various formats, each of which is known by those skilled in the art. The scrolling ticker application server 154 parses the input through a TTL filter 202 to determine whether the input data is time sensitive. If the input data is time sensitive and has an associated TTL, the data is passed through to the TTL content function 204 for input into the TTL scheduler 208. This data will be referred to as TTL data. If the input data is not time sensitive, the input data is passed through the content function 206 for input into the content scheduler 210. This data will be referred to as normal content data.

The TTL scheduler 208 will analyze the TTL data and determine a time for delivery of that TTL data. The TTL scheduler 208 may also determine minimum and maximum ranges of time for delivery of the TTL data. The content scheduler 210 will schedule delivery of the normal content data in accordance with a predetermined schedule. It should be noted that the predetermined schedule may be modified either by a user or administrator, it may be periodic or a-periodic, or it may even be based on "pull" requests by the user. It should also be noted that there may be various predetermined schedules based on the type of normal content data and the particular channel on which that normal content data is to be delivered. The output of the content scheduler 210 and the TTL scheduler 208 are fed into the scheduling logic 212. The scheduling logic 212 performs a comparison function in which the time for delivery of the TTL data as determined by the TTL scheduler 208 is compared to the next scheduled delivery of the normal content data as processed by the content scheduler 210. If the comparison function determines that the next scheduled delivery from the content scheduler 210 is within an acceptable time frame for delivery of the TTL data as determined by the TTL scheduler 208, then the scheduling logic will schedule the delivery of the TTL data to coincide with the delivery of the normal content data. In this context, coincide may mean that the delivery of the two data types will be serial or alternatively, the delivery may be parallel on different RSS channels, or some combination of the two. The scheduling logic 212 will then initiate delivery of the content in accordance with the scheduling comparison functionality.

Figure 7:
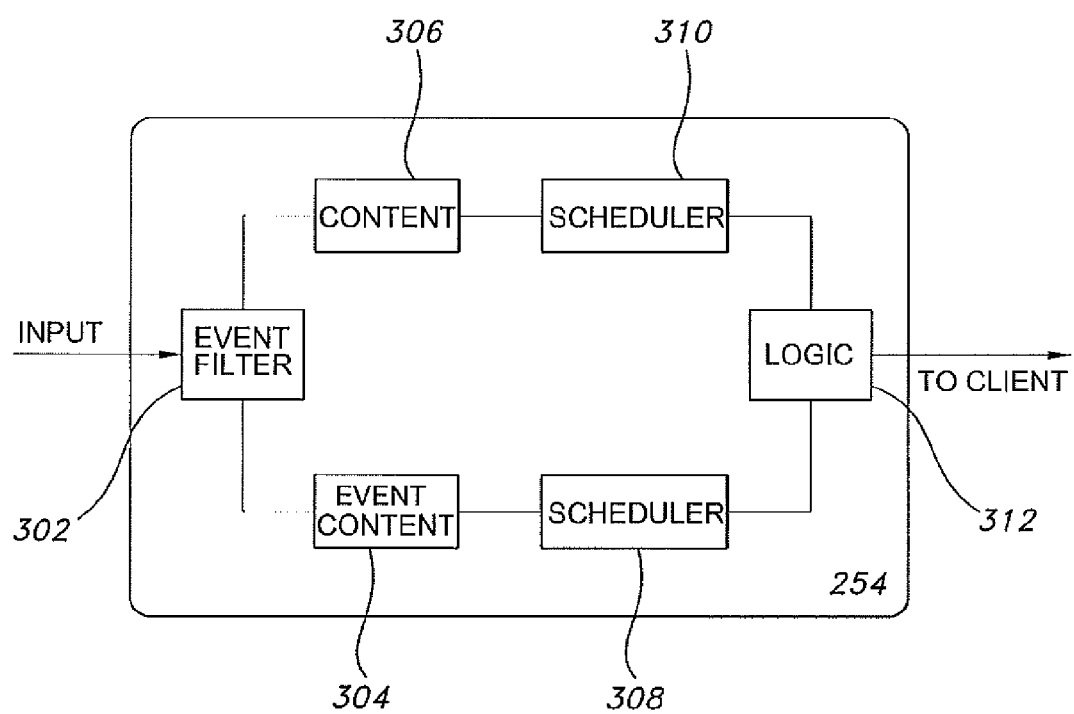
FIG. 7 is an alternative embodiment of the scheduling functionality in accordance with the present invention.

Turning now to FIG. 7, there is shown an alternative embodiment of the present invention. An alternative block diagram which illustrates functionally the scheduling logic of the scrolling ticker application server 254 is shown. Input to the server may come from a variety of sources in various formats, each of which is known by those skilled in the art. The scrolling ticker application server 254 parses the input through an event filter 302 to determine whether the input data is related to an event and therefore is time sensitive. If the input data is time sensitive and has an associated TTL, the data is passed through to the event content function 304 for input into the event scheduler 308. This data will be referred to as event data. If the input data is not time sensitive, the input data is passed through the content function 306 for input into the content scheduler 310. This data will be referred to as non-event content data.

The event scheduler 308 will analyze the event data and determine a time for delivery of that event data. The event scheduler 308 may also determine minimum and maximum ranges of time for delivery of the event data. The event scheduler 308 may determine that event data be delivered periodically during a time period associated with an event, or alternatively, the event scheduler 308 may determine that the event data be delivered a-periodically during the event based on some action that occurs during the event, or some combination of the two. For example, if the event is a football game, the event scheduler 308 may determine to deliver updated event data every fifteen minutes, or alternatively, the event scheduler 308 may determine to deliver updated event data every time the score changes, or some combination of the two.

The content scheduler 310 will schedule delivery of the non-event content data in accordance with a predetermined schedule. It should be noted that the predetermined schedule may be modified either by a user or administrator. It should also be noted that there may be various predetermined schedules based on the type of normal content data and the particular channel on which that normal content data is to be delivered. The output of the content scheduler 310 and the TTL scheduler 308 are fed into the scheduling logic 312.

The scheduling logic 312 will exercise a series of scheduling rules as determined by a user or an administrator. For example, scheduling logic 312 may suspend delivery of all non-event content data during the time period associated with the event and deliver only event data during that time period. Alternatively, the scheduling logic 312 may perform a comparison function similar to the comparison function set forth above in which the time for delivery of the event data as determined by the event scheduler 308 is compared to the next scheduled delivery of the non-event content data as processed by the content scheduler 310. If the comparison function determines that the next scheduled delivery from the content scheduler 310 is within an acceptable time frame for delivery of the event data as determined by the event scheduler 308, then the scheduling logic will schedule the delivery of the TTL data to coincide with the delivery of the normal content data. In this context, coincide may mean that the delivery of the two data types will be serial or alternatively, the delivery may be parallel on different RSS channels, or some combination of the two. Alternatively, the scheduling logic 312 may simply deliver the non-event content data in accordance with its normal schedule and deliver the event data when received. In any case, the scheduling logic 312 will then initiate delivery of the content in accordance with the scheduling comparison functionality.

Figure 4:
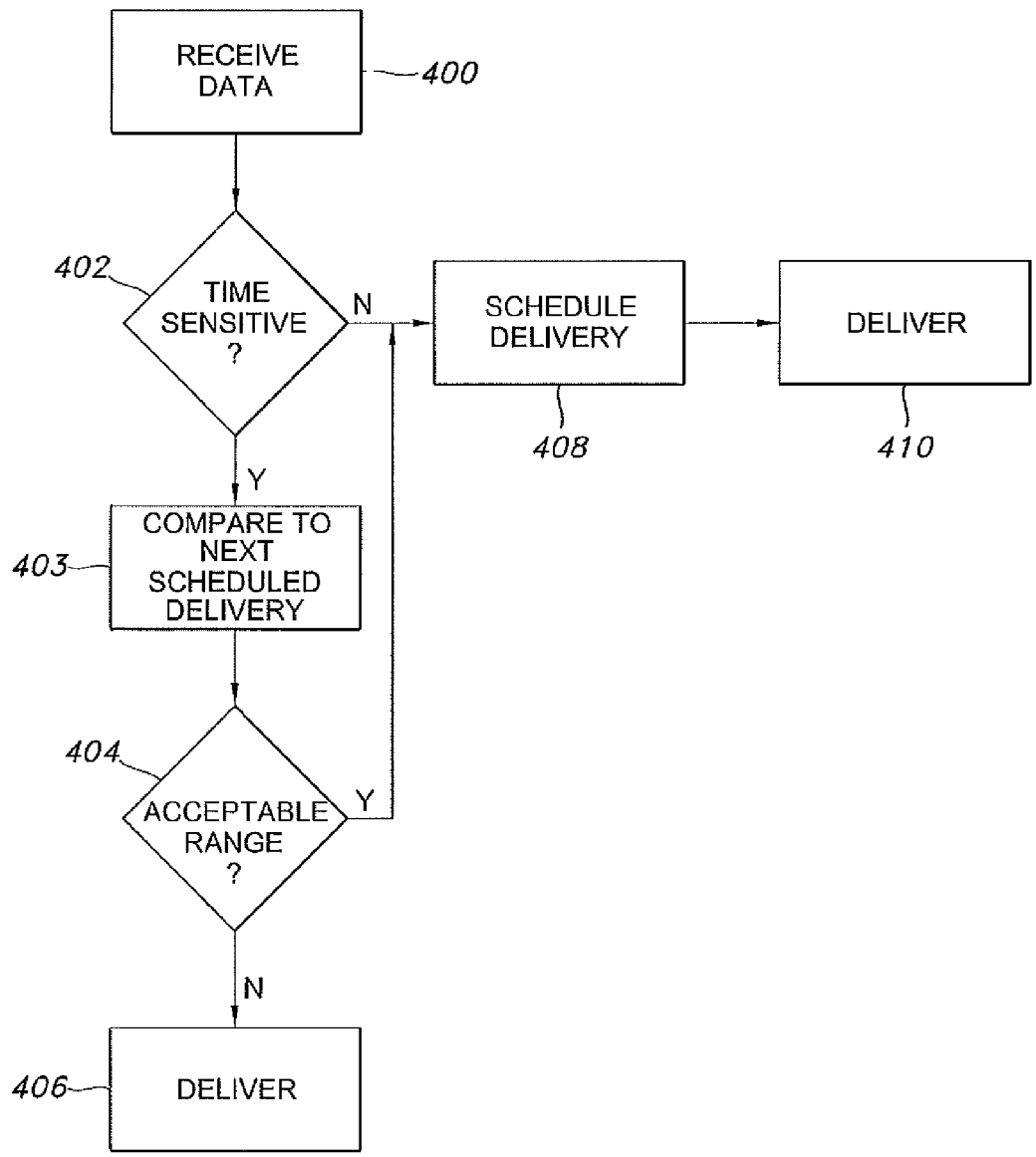
FIG. 4 is a flow chart illustrating a preferred embodiment of the method of the present invention.
Figure 5:
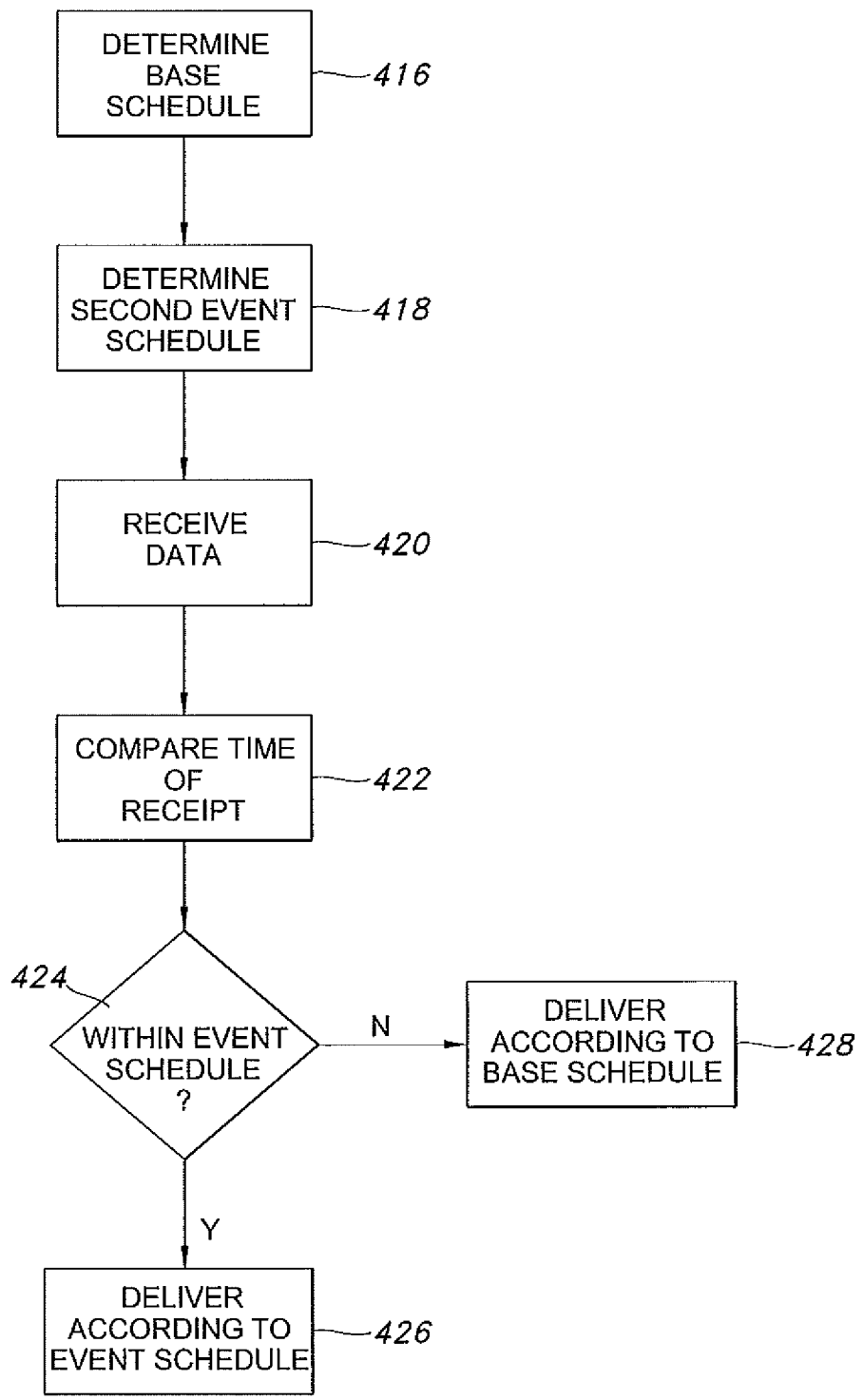
FIG. 5 is a flow chart illustrating an alternative embodiment of the method of the present invention.
Figure 6:
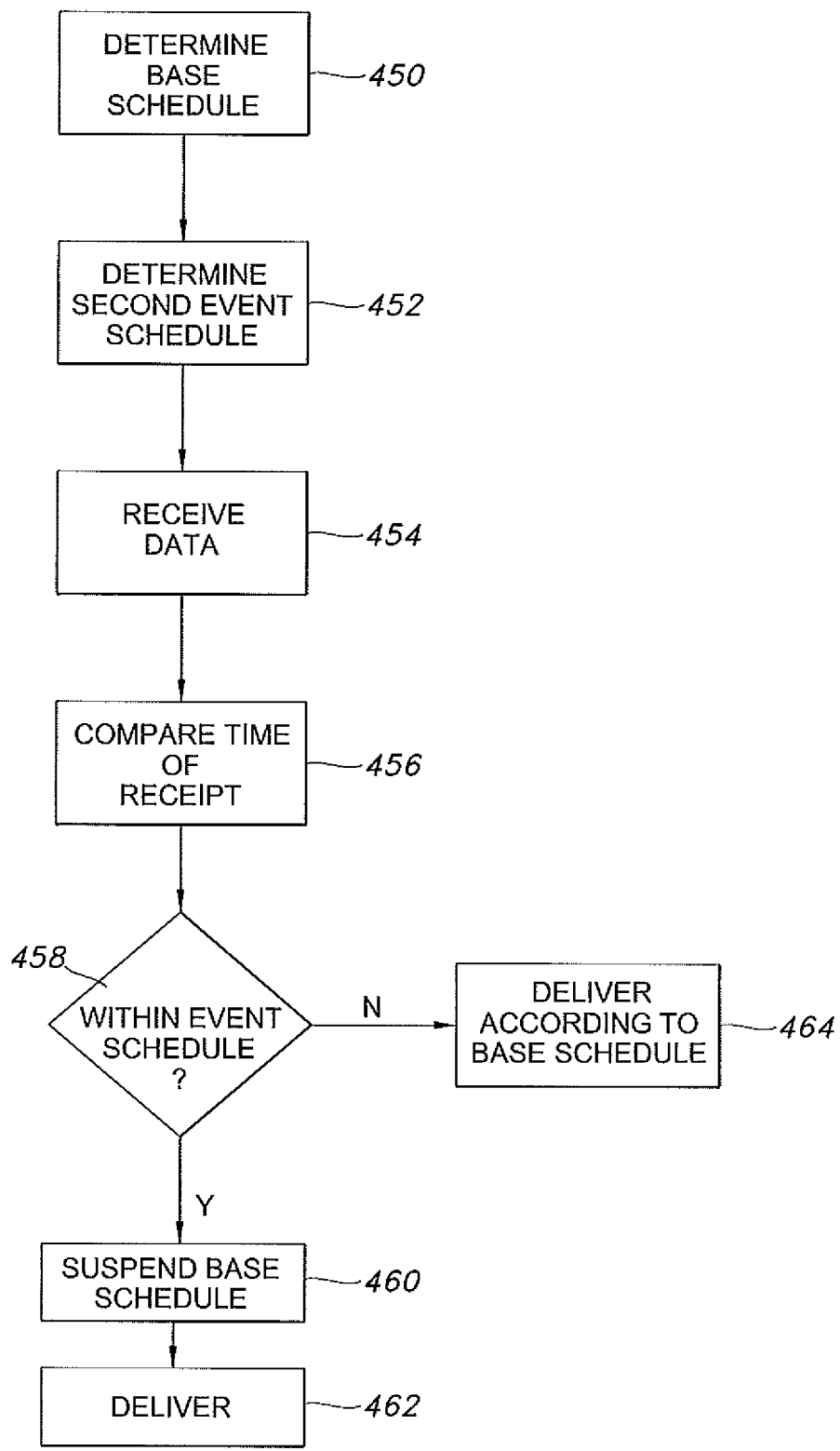
FIG. 6 is a flow chart illustrating an alternative embodiment of the method of the present invention.

FIGS. 4, 5, and 6 are flow charts illustrating various embodiments of the method of the present invention. With respect to FIG. 4, data is received at the scrolling ticker application server 154 at action block 400. At decision block 402, a determination is made as to whether the data received is time sensitive (TTL data). If the data is TTL data, the TTL data is passed to action block 403 where the preferred delivery time of the TTL data is compared to the next scheduled delivery of the content data. At decision block 404, if the preferred delivery time of the TTL data falls within all acceptable window around the next scheduled delivery of the content data, the TTL data is passed to action block 408 for delivery with the content data. At decision block 404, if the preferred delivery time of the TTL data does not fall within an acceptable window around the next scheduled delivery of the content data, then the TTL data is passed to action block 406 wherein it is independently scheduled for delivery to the MS 102.

Going back to decision block 402, if the data is not TTL data and therefore content data, the data is passed to action block 408 for scheduling of delivery. Recall that an affirmative output of decision block 404 may also be input into action block 408. From action block 408, any TTL data present and the content data are then delivered to the MS 102 in accordance with the next delivery time at action block 410.

Turning now to an alternative embodiment of the method of the present invention in FIG. 5, a base schedule is determined at action block 416 and a second event schedule is determined at block 418. Information is received at action block 420. At action block 422, the time period of receipt is compared to the base schedule and the second event schedule. If at decision block 424 it is determined that the data is received within a time window defined by the event schedule, then the event data is delivered in accordance with the second event schedule at action block 426. If at decision block 424 it is determined that the data was not received within a time window defined by the event schedule and therefore is considered non-event content data, the data is delivered in accordance with the base schedule at action block 428.

Turning now to yet another alternative embodiment of the present invention in FIG. 6, a base schedule is determined at action block 450 and a second event schedule is determined at action block 452. Information is received at action block 454 and passed to action block 456 where the time of receipt is compared to the base schedule and the second event schedule. At decision block 458, if the time of receipt falls within the second event schedule, then the base schedule is suspended at action block 460 and the event data is delivered at action block 462. If at decision block 458 it is determined that the time of receipt does not fall within the second event schedule, then the non-event content data is delivered in accordance with the base schedule at action block 464.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed is:

1. A method, for providing content data to a mobile communication device for display via a scrolling ticker of the mobile communication device, comprising:
receiving, by a scrolling-ticker application server, input content data comprising either time-sensitive content data or non-time-sensitive content data;
determining, by the scrolling-ticker application server, whether the input content data is time-sensitive content data or non-time-sensitive content data based on whether the input content data is marked by a time-to-live indicator indicating a preferred delivery timing for delivery of the input content data to the mobile communication device;
if the input content data is non-time-sensitive content data:
(a) scheduling, by the scrolling-ticker application server, the non-time-sensitive content data for delivery to the mobile communication device according to a default pre-established content-delivery schedule of the scrolling-ticker application server; and
(b) transmitting, by the scrolling-ticker application server, the non-time-sensitive content data to the mobile communication device, according to a next delivery time of the default predetermined content-delivery schedule, for presentation via the scrolling ticker of the mobile communication device; and
if the input content data is time-sensitive content data:
(a) comparing, by the scrolling-ticker application server, the preferred delivery timing, indicated by the time-to-live indicator, to the default pre-established content-delivery schedule;
(b) determining, by the scrolling-ticker application server, based on the comparing, whether the preferred delivery timing indicated by the time-to-live indicator falls within a predetermined window around the next delivery time of the default predetermined content-delivery schedule;
(c) if the preferred delivery timing, indicated by the time-to-live indicator, falls within the predetermined window around the next delivery time of the default predetermined content-delivery schedule:
scheduling, by the scrolling-ticker application server, the time-sensitive content data for delivery according to the default predetermined content-delivery schedule; and
transmitting, by the scrolling-ticker application server, the time-sensitive content data to the mobile communication device, according to the next delivery time of the default predetermined content-delivery schedule, for presentation via the scrolling ticker of the mobile communication device; and
(d) if the preferred delivery timing, indicated by the time-to-live indicator, does not fall within the predetermined window around the next delivery time of the default predetermined content-delivery schedule:
scheduling, by the scrolling-ticker application server, delivery of the time-sensitive content data according to an independent schedule differing from the default predetermined content-delivery schedule; and
transmitting, by the scrolling-ticker application server, the time-sensitive content data to the mobile communication device, according to the independent schedule, for presentation via the scrolling ticker of the mobile communication device.

2. The method of claim 1, further comprising modifying, by the scrolling-ticker application server, the default predetermined content-delivery schedule based on user input received from the mobile communication device.

3. The method of claim 1, wherein the default predetermined content-delivery schedule is based at least in part on a user pull request received from the mobile communication device.

4. The method of claim 1, wherein the default predetermined content-delivery schedule calls for at least one a-periodic delivery of content to the mobile communication device.

5. The method of claim 4, wherein the a-periodic delivery is initiated in response to an action occurring at an event associated with the input content data.

6. The method of claim 1, wherein determining, by the scrolling-ticker application server, whether the input content data is time-sensitive content data or non-time-sensitive content data based on whether the input content data is marked by a time-to-live indicator comprises determining whether the input content data has a time-to-live counter.

7. The method of claim 1, wherein determining, by the scrolling-ticker application server, whether the input content data is time-sensitive content data or non-time-sensitive content data based on whether the input content data is marked by a time-to-live indicator comprises determining whether the input content data has a time-to-live timestamp.

8. The method of claim 1, further comprising determining, by the scrolling-ticker application server, the default pre-established content-delivery schedule.

9. The method of claim 1, wherein the input content data is determined to be time-sensitive content data and comprises at least one piece of information selected from a group consisting of: stock information; sports scores; news; and weather content.

10. The method of claim 1, wherein the input content data is determined to be non-time-sensitive content data and comprises at least one piece of information selected from a group consisting of: stock information; sports scores; news; and weather content.

11. A non-transitory computer-readable medium comprising instructions, for use at a scrolling-ticker application server to provide content data to a mobile communication device for display via a scrolling ticker of the mobile communication device, that, when executed by a processor, cause the processor to perform operations comprising:
receiving input content data comprising either time-sensitive content data or non-time-sensitive content data;
determining whether the input content data is time-sensitive content data or non-time-sensitive content data based on whether the input content data is marked by a time-to-live indicator indicating a preferred delivery timing for delivery of the input content data to the mobile communication device;
if the input content data is non-time-sensitive content data:
(a) scheduling the non-time-sensitive content data for delivery to the mobile communication device according to a default pre-established content-delivery schedule of the scrolling-ticker application server; and
(b) transmitting the non-time-sensitive content data to the mobile communication device, according to a next delivery time of the default predetermined content-delivery schedule, for presentation via the scrolling ticker of the mobile communication device; and if the input content data is time-sensitive content data:
(a) comparing the preferred delivery timing, indicated by the time-to-live indicator, to the default pre-established content-delivery schedule;
(b) determining based on the comparing, whether the preferred delivery timing indicated by the time-to-live indicator falls within a predetermined window around the next delivery time of the default predetermined content-delivery schedule;
(c) if the preferred delivery timing, indicated by the time-to-live indicator, falls within the predetermined window around the next delivery time of the default predetermined content-delivery schedule:
scheduling the time-sensitive content data for delivery according to the default predetermined content-delivery schedule; and
transmitting the time-sensitive content data to the mobile communication device, according to the next delivery time of the default predetermined content-delivery schedule, for presentation via the scrolling ticker of the mobile communication device; and
(d) if the preferred delivery timing, indicated by the time-to-live indicator, does not fall within the predetermined window around the next delivery time of the default predetermined content-delivery schedule:
scheduling delivery of the time-sensitive content data according to an independent schedule differing from the default predetermined content-delivery schedule; and
transmitting the time-sensitive content data, to the mobile communication device, according to the independent schedule, for presentation via the scrolling ticker of the mobile communication device.

12. The non-transitory computer-readable medium of claim 11, wherein the instructions, when executed by the processor, cause the processor to perform the operations further comprising modifying the default predetermined content-delivery schedule based on user input received from the mobile communication device.

13. The non-transitory computer-readable medium of claim 11, wherein the default predetermined content-delivery schedule is based at least in part on a user pull request received from the mobile communication device.

14. The non-transitory computer-readable medium of claim 11, wherein the default predetermined content-delivery schedule calls for at least one a-periodic delivery of content to the mobile communication device.

15. The non-transitory computer-readable medium of claim 14, wherein the a-periodic delivery is initiated in response to an action occurring at an event associated with the input content data.

16. A scrolling-ticker application server, for providing content data to a mobile communication device for display via a scrolling ticker of the mobile communication device, comprising:
a processor; and
a computer-readable storage device being in operative communication with the processor and including computer-executable instructions that, when executed the processor, cause the processor to perform operations comprising:
receiving input content data comprising either time-sensitive content data or non-time-sensitive content data;
determining whether the input content data is time-sensitive content data or non-time-sensitive content data based on whether the input content data is marked by a time-to-live indicator indicating a preferred delivery timing for delivery of the input content data to the mobile communication device;
if the input content data is non-time-sensitive content data:
(c) scheduling the non-time-sensitive content data for delivery to the mobile communication device according to a default pre-established content-delivery schedule of the scrolling-ticker application server; and
(d) transmitting the non-time-sensitive content data to the mobile communication device, according to a next delivery time of the default predetermined content-delivery schedule, for presentation via the scrolling ticker of the mobile communication device; and
if the input content data is time-sensitive content data:
(e) comparing the preferred delivery timing, indicated by the time-to-live indicator, to the default pre-established content-delivery schedule;
(f) determining based on the comparing, whether the preferred delivery timing indicated by the time-to-live indicator falls within a predetermined window around the next delivery time of the default predetermined content-delivery schedule;
(g) if the preferred delivery timing, indicated by the time-to-live indicator, falls within the predetermined window around the next delivery time of the default predetermined content-delivery schedule:
scheduling the time-sensitive content data for delivery according to the default predetermined content-delivery schedule; and
transmitting the time-sensitive content data to the mobile communication device according to the next delivery time of the default predetermined content-delivery schedule, for presentation via the scrolling ticker of the mobile communication device; and
(h) if the preferred delivery timing, indicated by the time-to-live indicator, does not fall within the predetermined window around the next delivery time of the default predetermined content-delivery schedule:
scheduling delivery of the time-sensitive content data according to an independent schedule differing from the default predetermined content-delivery schedule; and
transmitting the time-sensitive content data to the mobile communication device, according to the independent schedule, for presentation via the scrolling ticker of the mobile communication device.

17. The scrolling-ticker application server of claim 16, wherein the operations further comprise modifying the default predetermined content-delivery schedule based on user input received from the mobile communication device.

18. The scrolling-ticker application server of claim 16, wherein the default predetermined content-delivery schedule is based at least in part on a user pull request received from the mobile communication device.

19. The scrolling-ticker application server of claim 16, wherein the default predetermined content-delivery schedule calls for at least one a-periodic delivery of content to the mobile communication device.

20. The scrolling-ticker application server of claim 19, wherein the a-periodic delivery is initiated in response to an action occurring at an event associated with the input content data.

* * * * *